(12) United States Patent  (10) Patent No.: US 9,398,178 B2
Miyagawa et al. (45) Date of Patent: Jul. 19, 2016

(54) DISPLAY DEVICE HAVING IMAGE PICKUP FUNCTION AND TWO-WAY COMMUNICATION SYSTEM

(71) Applicant: Semiconductor Energy Laboratory Co., Ltd., Atsugi-shi, Kanagawa-ken (JP)

(72) Inventors: Keisuke Miyagawa, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 185 days.

(21) Appl. No.: 13/754,947

(22) Filed: Jan. 31, 2013

(65) Prior Publication Data

US 2013/0147907 A1 Jun. 13, 2013

Related U.S. Application Data

(62) Division of application No. 13/053,352, filed on Mar. 22, 2011, now Pat. No. 8,384,824, which is a division of application No. 10/887,898, filed on Jul. 12, 2004, now Pat. No. 7,916,167.

(30) Foreign Application Priority Data

Jul. 16, 2003 (JP) .................................. 2003-275185

(51) Int. Cl.
*H04N 1/00* (2006.01)
*H04N 5/232* (2006.01)
(52) U.S. Cl.
CPC ....... *H04N 1/00307* (2013.01); *H04N 1/00129* (2013.01); *H04N 5/23293* (2013.01)
(58) Field of Classification Search
CPC .......... H04N 1/00129; H04N 1/00307; H04N 5/23293
See application file for complete search history.

(56) References Cited

U.S. PATENT DOCUMENTS

| 4,400,725 A | 8/1983 | Tanigaki |
| 4,928,301 A | 5/1990 | Smoot |

(Continued)

FOREIGN PATENT DOCUMENTS

| EP | 0581221 A1 | 2/1994 |
| EP | 1227390 A2 | 7/2002 |

(Continued)

OTHER PUBLICATIONS

Exhibition of Active Matrix Type Organic EL Display at "13th Flat Panel Display Manufacturing Technology Expo & Conference" by ELDis Group (in Japanese with full English translation); Jul. 2, 2003.

(Continued)

*Primary Examiner* — Timothy J Henn
(74) *Attorney, Agent, or Firm* — Fish & Richardson P.C.

(57) ABSTRACT

A compact and lightweight display device having an image pickup function and a two-way communication system which can shoot an image of a user as an object and display an image at the same time without degrading image quality by disposing a semi-transmitting mirror or the like which blocks an image on the display screen (display plane). The display device having the image pickup function includes a display panel capable of transmitting visible light at least and arranging display elements which can be controlled by voltage or current, and an image pickup device disposed around the display panel. The image pickup device is input with data of an image of a user or the like by a reflector, or equipped with a fiberscope bundling optical fibers.

34 Claims, 12 Drawing Sheets

(56) References Cited

U.S. PATENT DOCUMENTS

| | | | |
|---|---|---|---|
| 5,159,445 A | 10/1992 | Gitlin et al. | |
| 5,340,978 A * | 8/1994 | Rostoker et al. | 250/208.1 |
| 5,406,323 A | 4/1995 | Tanigaki et al. | |
| 5,532,736 A | 7/1996 | Kuriki et al. | |
| 5,815,197 A | 9/1998 | Kakii | |
| 6,005,604 A | 12/1999 | Kakii | |
| 6,137,526 A | 10/2000 | Kakii | |
| 6,278,884 B1 | 8/2001 | Kim | |
| 6,473,631 B1 | 10/2002 | Siddoway et al. | |
| 6,628,320 B2 | 9/2003 | Mukai et al. | |
| 6,646,672 B2 | 11/2003 | Feierbach | |
| 6,879,354 B1 | 4/2005 | Sawayama et al. | |
| 7,019,714 B2 | 3/2006 | Uchida et al. | |
| 7,019,717 B2 | 3/2006 | Yumoto et al. | |
| 7,162,209 B2 | 1/2007 | Ono | |
| 7,609,310 B2 | 10/2009 | Miyagawa | |
| 7,612,745 B2 | 11/2009 | Yumoto et al. | |
| 2002/0085143 A1 * | 7/2002 | Kim et al. | 349/61 |
| 2003/0076456 A1 * | 4/2003 | Lee et al. | 349/106 |
| 2003/0107692 A1 | 6/2003 | Sekiguchi | |
| 2003/0193288 A1 | 10/2003 | Pavlovsky | |
| 2004/0189794 A1 | 9/2004 | Rambo et al. | |
| 2004/0257473 A1 | 12/2004 | Miyagawa | |
| 2005/0174509 A1 | 8/2005 | Sawayama et al. | |

FOREIGN PATENT DOCUMENTS

| | | |
|---|---|---|
| EP | 1353316 A1 | 10/2003 |
| EP | 1489844 A2 | 12/2004 |
| JP | 03-026189 A | 2/1991 |
| JP | 04-052823 A | 2/1992 |
| JP | 04-145789 A | 5/1992 |
| JP | 04-167690 A | 6/1992 |
| JP | 05-145912 A | 6/1993 |
| JP | 05-292493 A | 11/1993 |
| JP | 06-030406 A | 2/1994 |
| JP | 06-098320 A | 4/1994 |
| JP | 06-169455 A | 6/1994 |
| JP | 06-245209 A | 9/1994 |
| JP | 07-043506 A | 2/1995 |
| JP | 07-143469 A | 6/1995 |
| JP | 08-195945 A | 7/1996 |
| JP | 8340520 A | 12/1996 |
| JP | 09-130768 A | 5/1997 |
| JP | 10-326515 A | 12/1998 |
| JP | 2000-059748 A | 2/2000 |
| JP | 3058367 A | 7/2000 |
| JP | 2000-298253 A | 10/2000 |
| JP | 2001-231019 A | 8/2001 |
| JP | 2001-351099 A | 12/2001 |
| JP | 2001-359064 A | 12/2001 |
| JP | 2002-014373 A | 1/2002 |
| JP | 2002-125031 A | 4/2002 |
| JP | 2002-282220 A | 10/2002 |
| JP | 2002-304136 A | 10/2002 |
| JP | 2002-357825 A | 12/2002 |
| JP | 2003-143272 A | 5/2003 |
| JP | 3408154 B2 | 5/2003 |
| JP | 2005-033784 A | 2/2005 |
| TW | 531718 A | 5/2003 |

OTHER PUBLICATIONS

Documents distributed in the "13th Flat Panel Display Manufacturing Technology Expo & Conference" by ELDis Group, Jul. 2, 2003 (5 pages).
"Two-way display developed"; The Japan Times; (1 page); Jul. 3, 2003.
"Mass Production of Organic EL Devices"; Shimotsuke Newspaper (in Japanese with full English translation); Jul. 3, 2003.
Kwan Hee Lee et al.; '2.2" QCIF Full Color Transparent AMOLED Display'; SID03 Digest; pp. 104-107; 2003.
Chinese Office Action (Chinese Application No. 2004100712248) 14 pages mailed May 9, 2008 with English translation.
Taiwan Office Action (Taiwanese Patent Application No. 93119210) dated Dec. 30, 2011 with English language translation.

* cited by examiner

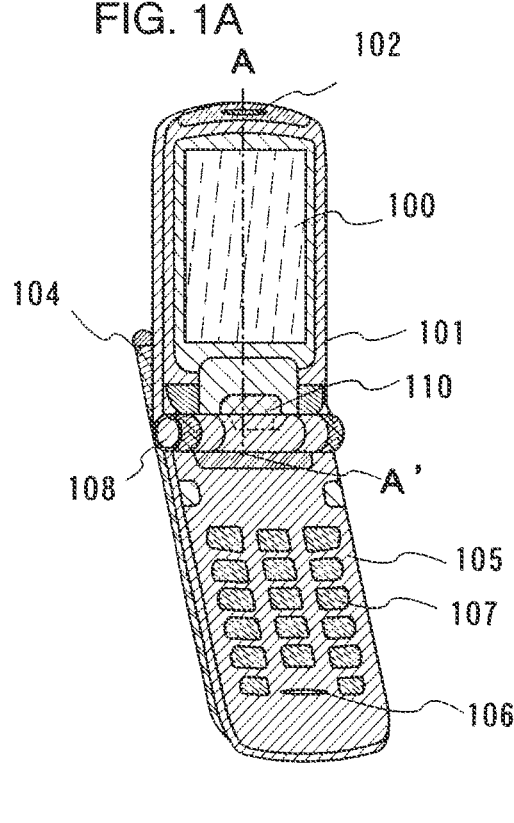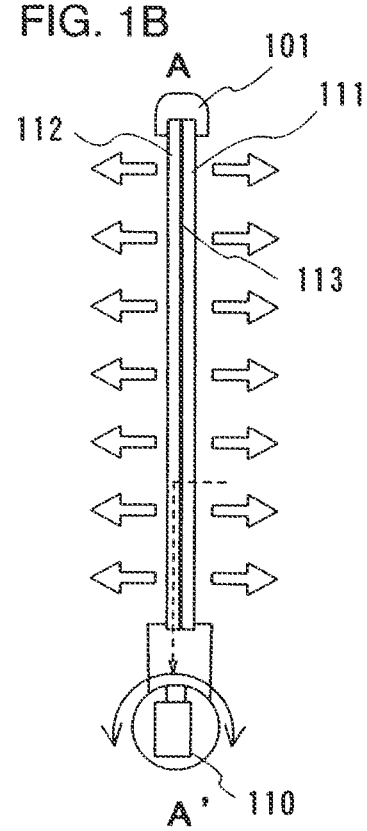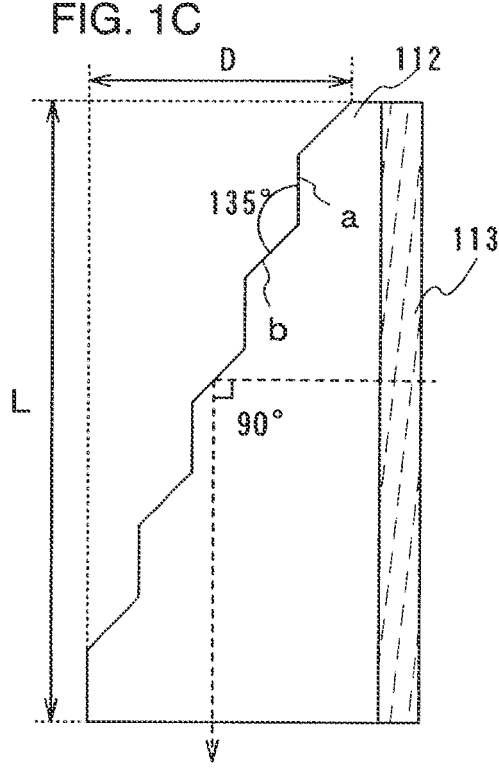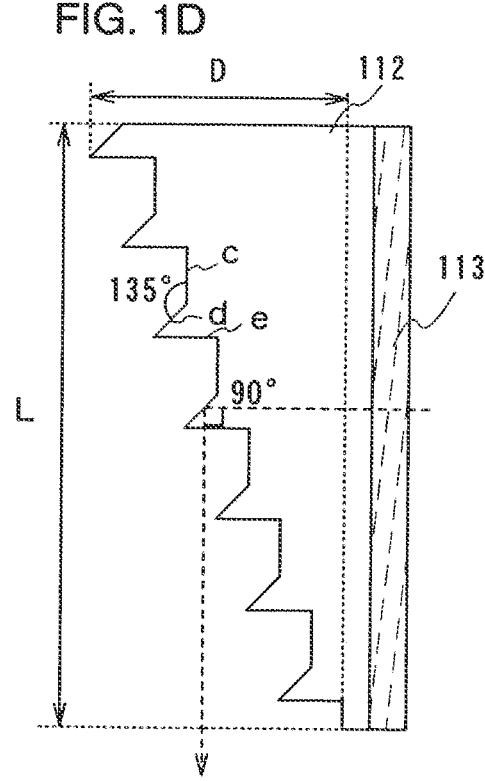

DISPLAY DEVICE HAVING IMAGE PICKUP FUNCTION AND TWO-WAY COMMUNICATION SYSTEM

CROSS-REFERENCE TO RELATED APPLICATIONS

This application is a divisional of U.S. application Ser. No. 13/053,352, filed Mar. 22, 2011, now allowed, which is a divisional of U.S. application Ser. No. 10/887,898, filed Jul. 12, 2004, now U.S. Pat. No. 7,916,167, which claims the benefit of a foreign priority application filed in Japan as Serial No. 2003-275185 on Jul. 16, 2003, all of which are incorporated by reference.

BACKGROUND OF THE INVENTION

1. Field of the Invention

The present invention relates to a display device having an image pickup function which can display an image and shoot an image of an object at the same time. More particularly, the invention relates to a two-way communication system which can shoot an image of a user as an object while displaying an image of the other party.

2. Description of the Related Art

In recent years, with the advance in speed of telecommunication networks, what is called a two-way communication system such as a videophone system and a video conference has been developed, in which two parties can communicate while viewing an image of each other.

According to the two-way communication system, it is possible to shoot an image of an object (user, for example) and to display an image of the other party at the same time.

For example, an image-pickup display device having a special screen which turns to be transparent or opaque according to an incident angle of light, and an image pickup device and a projector display device each disposed in the rear of the screen is disclosed (see Patent Document 1 for example). According to such an image pickup display device, two parties can catch each other's eyes when their images are projected by the projector display device which is disposed in the opaque direction of the screen.

However, according to the Patent Document 1, it requires a special screen as well as an image pickup device and a projector display device, leading to a large and heavyweight device. Therefore, such a device cannot be applied to a portable electronic device.

In addition, an image pickup display device having multiple small semi-transmitting mirrors each slanted slightly is disclosed (see Patent Document 2 for example). Alternatively, an image pickup display device having multiple total reflection mirrors each slanted slightly in a spaced relationship so as to serve as semi-transmitting mirrors are disclosed (see Patent Document 3 for example). Such image pickup display devices are downsized by slantingly disposing semi-transmitting mirrors.

However, according to the image pickup display device in each of the above Patent Documents, semi-transmitting mirrors are disposed over an entire display screen (display plane) of the display device, and users look at the display screen (display plane) through the semi-transmitting mirrors. Therefore, quality of the display screen (display plane) which is viewed by a user is inevitably degraded.

[Patent Document 1] Japanese Patent Laid-Open No. Hei 6-030406

[Patent Document 2] Japanese Patent Laid-Open No. Hei 5-145912

[Patent Document 3] Japanese Patent Laid-Open No. Hei 5-292493

SUMMARY OF THE INVENTION

In view of the foregoing problems, the invention provides a compact and lightweight display device having an image pickup function and a two-way communication system which can shoot an image of an object (user, for example) and display an image at the same time without degrading image quality by disposing a semi-transmitting mirror or the like which blocks an image on the display screen (display plane).

In addition, the invention provides a compact and lightweight display device having an image pickup function and a two-way communication system which can display an image and shoot an image of a user as an object while securing an eye focus of the user who is viewing the displayed image.

The invention provides a display device having an image pickup function including a display panel capable of transmitting visible light at least and arranging display elements which can be controlled by voltage or current, and an image pickup device disposed around the display panel (upper side or lower side, or the like). The image pickup device according to the invention is input with data of an image of a user (hereinafter referred to as image data) or the like by a reflector, or equipped with a fiberscope bundling optical fibers.

It is also possible to input image data condensed by an optical system such as a lens to the image pick up device through reflection by a reflector. Alternatively, image data reflected by a reflector can be input to the image pickup device after being condensed by an optical system or the like. By disposing the reflector or the lens in this manner, the position of the image pickup device and in particular, a direction of the lens of the image pickup device can be controlled.

According to the invention, the image pickup device can be disposed around the display panel by using a reflector as well as an optical system typified by a lens. Therefore, further downsizing of the device can be achieved as compared to the structure in which the image pickup device is disposed in the rear (on the back) of the display panel.

As a reflector, a structure of forming a highly reflective film over a part of a substrate formed with depressions and projections in the display panel can be used. By forming such a reflector over the substrate of the display panel, the device can be further downsized. Note that the reflector may be a small mirror or a semi-transmitting mirror, and they may be single or multiple.

The lens may have a function to condense image data. For example, a microlens can be used. In addition, a light emitting element or a liquid crystal element can be used as a display element.

The display panel is constructed so as to display various images including a still image or a moving image by controlling the luminance of each pixel so that a user can view the images.

As an embodiment of the display panel, there is the one having light emitting elements whose emission such as luminance or lighting period can be controlled by voltage or current. It is more preferable that the pixel is formed by using a light-emitting element which includes a pair of light-transmitting electrodes and a light-emitting material sandwiched between them. The light emitting material is preferably the one which generates electroluminescence which allows other relevant materials to be sandwiched between the pair of the electrodes additionally.

The light emitted from the pixel includes light within the visible light spectrum. The display panel may be formed either by arranging pixels of the same emission color, or by arranging pixels of the specified emission color in the specified area, what is called an area color display panel. Further, it may be formed by arranging pixels of a plurality of different emission colors so as to perform a multi-color display as well. Alternatively, it may be formed by arranging pixels of white emission. It is also possible to form the display panel so that a user can recognize the emission of the pixels through a colored layer (color filter or a color conversion layer).

It is preferable that a laminate of the pair of the electrodes and the light-emitting material sandwiched between them as the components constituting the light-emitting element are formed by using light-transmitting materials or formed to be thin enough to maintain light transmissivity. A display panel which is fabricated by using a pair of light-transmitting electrodes in this manner and emits light from light emitting elements to the both screen sides is hereinafter referred to as a dual emission display panel.

For example, as a material to form the pair of the electrodes, a light-transmitting conductive film material including indium oxide, zinc oxide or tin oxide (ITO, ITSO, IZO or ZnO), aluminium including alkali metal or alkaline earth metal, silver, other metal materials or a metal material including alkali metal or alkaline earth metal is used. The pair of the electrodes are formed by using the above material. In the case of using a non light-transmitting material for the pair of the electrodes, they are preferably formed to be thin enough to transmit visible light (100 nm or less, or more preferably, 20 to 50 nm).

According to the invention, by forming one of the pair of electrodes constituting the light-emitting element by using a light-transmitting conductive film material and the other electrode by using the aforementioned metal material so as to control the film thickness of each electrode, the ratio of light emitted from each electrode to outside can be controlled to be different. That is, the electrode formed by using the light-transmitting conductive film material can emit light at a higher luminance than the other electrode formed by using the metal material.

According to another embodiment of the display panel, a display panel having liquid crystal elements (liquid crystal panel) whose molecular arrangement can be controlled by voltage can be provided, in which image display is controlled by light from a light source.

In addition, when using liquid crystal elements and using a non-light transmitting electrode, the display panel can have light transmissivity by forming an opening thereon.

According to the invention, the display device having an image pickup function can be fabricated in thinner size and lighter weight by forming light emitting elements or liquid crystal elements in the pixels over a flat substrate.

The image pickup device can shoot an image of an object through the display panel. That is, the image pickup device is disposed so as to shoot an image of the object by receiving the light that has passed through the display panel or through both the display panel and the substrate mounting the display panel.

The image pickup device has a solid-state image pickup element. Specifically, it is desirable that the image pickup device has a camera (image pickup device) including a light-receiving portion formed by using an optical sensor of a CCD (Charge Coupled Device) type or a CMOS (Complementary MOS) type.

By using the display device having an image pickup function of the invention, the two-way communication system can be provided that two parties can communicate with each other through wire transmission or radio transmission while viewing an image of each other on the display screen (display plane). In addition, according to the two-way communication system of the invention, at least one party is required to have the display device having an image pickup function which can shoot an image of himself as an object while displaying an image of the other party on the display panel. Similarly, in light of the other party, he can view an image of his interlocutor (user) on the display panel while shooting an image of himself.

In addition, the display panel can display an image of the other party, an image of the user himself, text, figures, and graphic symbols. Furthermore, in two-way communication system by two people or more, an image of the user can be displayed on the display panel in addition to the image of the other side.

According to the invention, by forming a light-transmitting display panel, light from pixels is emitted not only to one screen side which is viewed by a user but also to the opposite screen side. In that case, it is concerned that unnecessary light for an object might be input to the image pickup device. Then, it is more preferable that the image pickup device is provided with a correction device in which a deviation in color or luminance of an image is corrected corresponding to the light transmissivity of the display panel, and a correction device in which the glare caused by light reflecting on the display panel is eliminated from an image.

According to the invention, by implementing a quite lightweight and thin display panel and an image pickup device, a compact and lightweight display device having an image pickup function can be provided. In particular, since the image pickup device can be disposed around the display panel by using a reflector as well as an optical system typified by a lens, further downsizing of the device can be achieved as compared to the structure in which the image pickup device is disposed in the rear of the display panel.

According to the structure of the invention, it is possible to shoot an image of an object (user, for example) and to display an image of the other party to be viewed by the user on a display screen (display plane) at the same time without disposing anything which interrupts the user's view between the display panel and the user. In addition, as an image displayed on the display panel, multi-window display for each image of the user and the other party can be performed.

Furthermore, it is also possible for a user to shoot an image of himself while seeing the displayed image of himself on the display panel. At this time, a high-quality image can be shot while securing an eye focus of the user even if he is viewing his own image.

In addition, when shooting an image of the other party and displaying the image on the display panel of the other party, each of the shooter and the other party can view the same image while shooting. At this time, the normal display is performed on the display panel of the shooter side while the inversion display is performed on the display panel of the other party. That is, the image is displayed in a mirror projection manner on the display panel of the other party.

According to the invention, a display device having an image pickup function and a two-way communication system is provided, in which image shooting and image display can be performed at the same time while securing an eye focus of the user who is viewing the displayed image. In particular, when two parties use the similar display devices having an image pickup function of the invention, they can communicate while catching each other's eyes.

The two-way communication system of the invention includes a display panel which can shoot an image as described above, in which it is possible to display an image of the user on the display panel in addition to an image of the other party while shooting an image of the user as an object.

BRIEF DESCRIPTION OF THE DRAWINGS

FIGS. 1A and 1B each illustrates a portable phone of the invention.

FIGS. 1C and 1D each illustrates an enlarged view of the portable phone of the invention.

DETAILED DESCRIPTION OF THE INVENTION

Figure 2A:
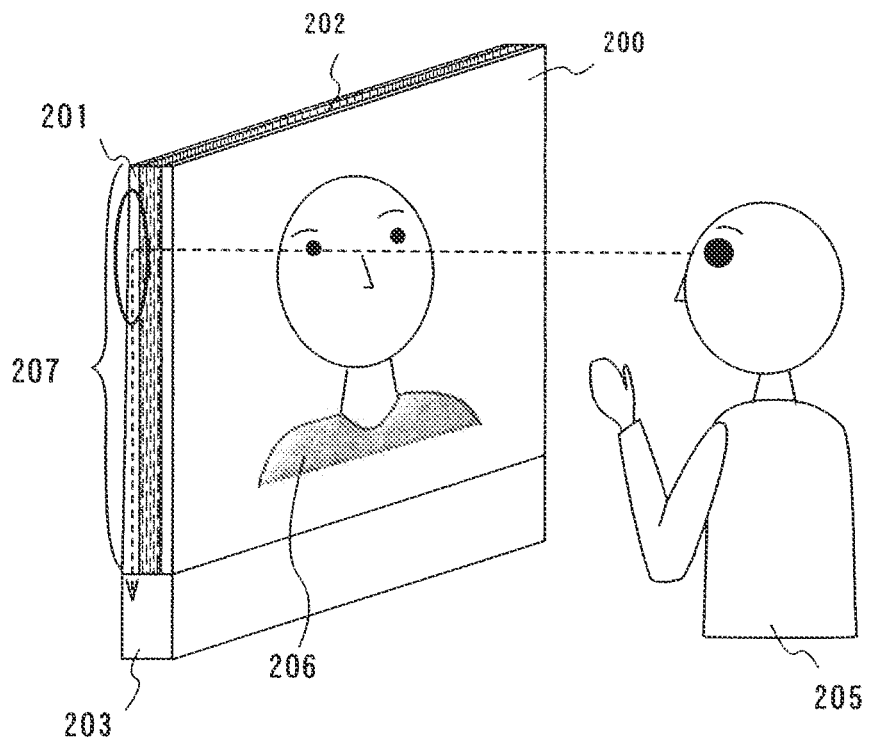
FIG. 2A illustrates a videophone system of the invention.

Embodiment modes of the invention are described below with reference to the accompanying drawings. Note that like components are denoted by identical numerals as of the first embodiment and will be explained in no more details Embodiment Mode 1

Described in this embodiment mode is a portable phone having a dual emission display panel as an example of a display device having an image pickup function. Note that dual emission display panel herein defined is a display panel including a pair of light-transmitting electrodes, in which light from light emitting elements are emitted to both screen sides. It may simply be referred to as a dual emission panel.

FIG. 1A illustrates an overall view of a portable phone. FIG. 1B illustrates a cross-sectional view of a dual emission panel corresponding to a display panel. FIGS. 1C and 1D each illustrates an enlarged view of a display panel.

The portable phone shown in FIG. 1A includes a dual emission display panel 100 and a first housing 101 surrounding and sandwiching an edge of the dual emission panel 100. The first housing 101 includes an audio output portion 102, an antenna 104 or the like. A second housing 105 including an audio input portion 106, an operating key 107 or the like is connected to the first housing 101 with a hinge 108. An image pickup device 110 corresponding to an image pickup device is disposed at the bottom of the dual emission panel 100.

As shown in FIG. 1B, the dual emission panel 100 includes first and second substrates 111 and 112 each having light transmissivity and an area having an EL layer (EL layer area) 113 sandwiched between them. Therefore, light is emitted in both directions of the substrates (as shown by arrows).

The first housing 101 can be formed thin since the dual emission panel 100 is quite thin. Therefore, in this embodiment mode, the image pickup device 110 is disposed not in the first housing 101, but in the hinge 108 in a rotatable manner. At this time, a lens included in the image pickup device 110 is disposed so as to face either side of the dual emission panel 100, the user side or the opposite side of the user. That is, the rotation angle of the image pickup device may be 180 to 250 degrees.

When carrying out two-way communication, the image pickup device 110 may be set so as to face the dual emission panel 100. At this time, the lens of the image pickup device 110 cannot be recognized by a user. In addition, when shooting an image of the user as an object, the lens of the image pickup device 110 may be set to face the user side while it may be set to face the opposite side when shooting an image of people or things in the opposed side of the user.

Note that the image pickup device 110 may be set to face either the user side or the opposite side thereof even in carrying out two-way communication. In particular, when two-way communication is carried out with the image pickup device 110 facing the opposite side, a two-way communication can be carried out including a third party, in addition to the user and the other party, who is communicating directly with the user while viewing an image displayed on the dual emission panel. That means, by implementing the dual emission panel, two-way communication can be carried out including the third person while being recognized by the other two parties.

When the image pickup device 110 cannot be disposed in the first housing 101 owing to the thinner shape of the dual emission panel 100, image data can be received by disposing the image pickup device 110 in the hinge 108 or in the second housing 105 as shown in this embodiment mode.

According to this embodiment mode, a thinner portable phone can be fabricated by disposing the image pickup device 110 not in the rear of the display panel 100, but around the dual emission panel 100, for example, at the bottom of the dual emission panel 100 as shown in FIG. 1B. Specifically, the first housing 101 can be formed thin by using the dual emission panel 100 and disposing the image pickup device 110 in the hinge 108 or the second housing 105. Image data from outside is input to the image pickup device 110 after being reflected by a reflector or the like.

Note that the dual emission panel 100 may be either an active matrix type or a passive matrix type. In the case of the passive matrix display panel, higher light transmissivity can be obtained as compared to the active matrix display panel.

FIGS. 1C and 1D each illustrates an enlarged view of a dual emission panel with one mode of a specific reflector. Each of them shows a structure of the second substrate 112 formed with depressions and projections, on part of which a reflector is formed. Note that a region of the substrate for forming depressions and projections may correspond to a pixel portion at least.

Specific shapes of depressions and projections of the substrate are described now with reference to FIG. 1C. In the cross-sectional diagram, a length of an area having depressions and projections is denoted by L while a width thereof is denoted by D. Only one side of the substrate is formed with depressions and projections while the other side thereof has a flat surface. Specifically, the opposite side of the EL layer of the substrate has depressions and projections while the side having the EL layer has a flat surface. This second substrate 112 is attached to the first substrate 111 as a sealing substrate. In addition, each of the depressions and projections alternately includes a surface a which is parallel to the flat surface and a surface b which makes an angle of 135 degrees with the surface a. The width D of the depressions and projections is smaller by degrees in a farther place from the image pickup device 110, and the surfaces a and b are formed in stages. A reflector is formed over the surface b. This reflector may be formed of a metal film by vapor deposition or sputtering.

According to such a substrate having depressions and projections, image data is input to the image pickup device 110, and the image displayed on the dual emission panel 100 can be recognized from either side of the first substrate 111 or the second substrate 112. At this time, image data reflected by the reflector is input to the image pickup device 110 through the second substrate 112. Specifically, the image data is input to the image pickup device 110 by the reflector formed on the surface b of the substrate having depressions and projections, and the image displayed on the dual emission panel 100 can be recognized from the second substrate 112 side as well through the light-transmitting surface a.

Note that although FIG. 1C shows an example in which image data is input to the image pickup 110 after being reflected by the reflector at an angle of approximately 90 degrees assuming that the surface a makes an angle of 135 degrees with the surface b, the invention is not limited to this. That is, an angle made by the surfaces a and b, an angle at which an object is reflected or the like can be set by taking account of the position of the image pickup device 110, the state of an object, intensity of external light, material of the substrate or the like.

FIG. 1D illustrates depressions and projections having a different structure from that in FIG. 1C. In the cross-sectional diagram, a length of an area having depressions and projections is denoted by L while a width thereof is denoted by d. Only one side of the substrate is formed with depressions and projections while the other side thereof has a flat surface. Specifically, the opposite side of the EL layer of the substrate has depressions and projections while the side having the EL layer has a flat surface. This second substrate 112 is attached to the first substrate 111 as a sealing substrate. In addition, each of the depressions and projections alternately includes a surface c which is parallel to the flat surface, a surface d which makes an angle of 135 degrees with the surface c and a surface e which makes a right angle with the surface c. The width D of the area having depressions and projections is larger by degrees in a farther place from the image pickup device 110. A reflector is formed over the surface d. This reflector may be formed of a metal film by vapor deposition or sputtering.

According to such a substrate having depressions and projections, image data is input to the image pickup device 110, and the image displayed on the dual emission panel 100 can be recognized from either side of the first substrate 111 or the second substrate 112. At this time, image data reflected by the reflector is input to the image pickup device 110 through something outside the second substrate 112, for example through air. Specifically, the image data is input to the image pickup device 110 by the reflector formed on the surface d of the substrate having depressions and projections, and the image displayed on the dual emission panel 100 can be recognized from the second substrate 112 as well through the light-transmitting surface c.

Note that although FIG. 1D shows an example in which image data is input to the image pickup 110 after being reflected by the reflector at an angle of approximately 90 degrees assuming that the surface c makes an angle of 135 degrees with the surface d, the invention is not limited to this. That is, an angle made by the surfaces c and d, an angle at which an object is reflected or the like can be set by taking account of the position of the image pickup device 110, the state of an object, intensity of external light, material of the substrate or the like.

Figure 10:
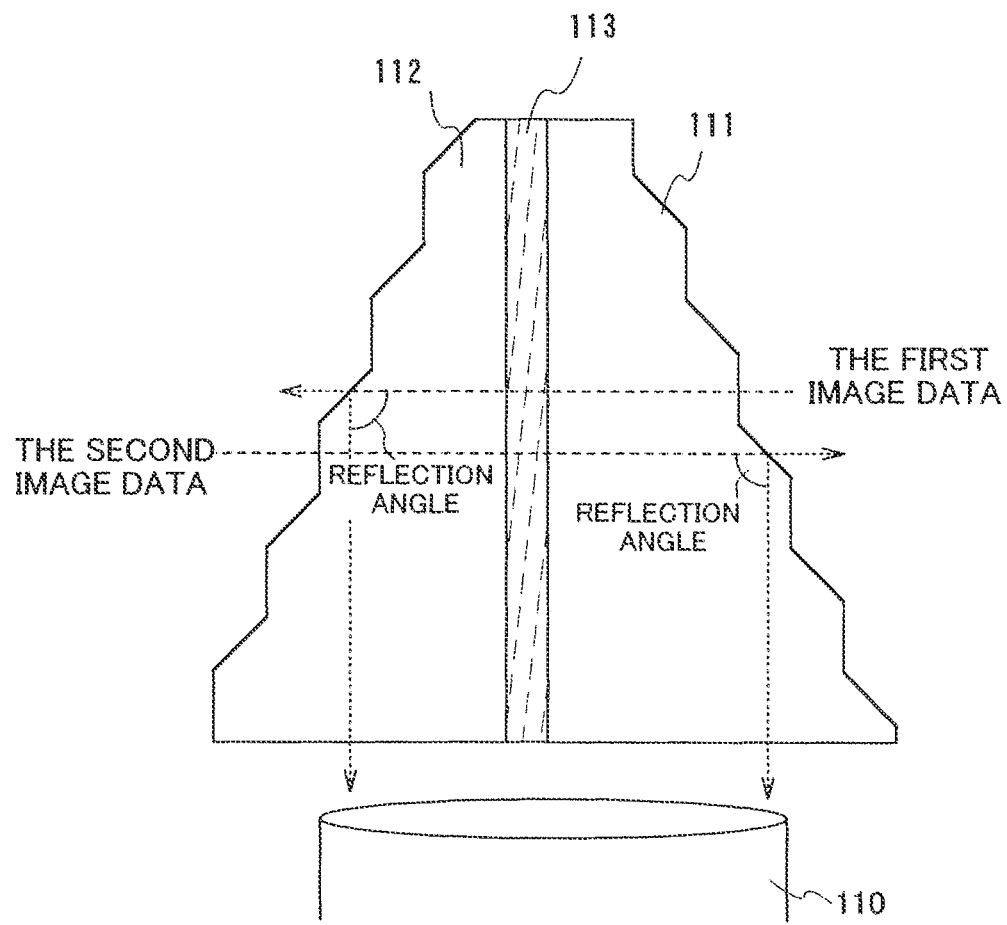
FIG. 10 illustrates a diagram of a portable phone of the invention.

Although the above description is the case of processing the second substrate 112, the first substrate 111 may be processed alternatively. When using a dual emission panel in particular, a first image data from the first substrate 111 side and a second image data from the second substrate 112 side can be each input to the lens of the image pickup device 110 by processing both of the first and second substrates 111 and 112 as shown in FIG. 10 so that each reflector on the first substrate 111 and the second substrate 112 is disposed alternately. As a reflector for this case, a half mirror coated with multiple dielectric thin film layers is preferably used. As a result, only a part of the first and second image data passes through the reflector whereas the rest is input to the image pickup device 110 after being reflected.

In addition, in FIG. 10, the second image data reflected on the first substrate 111 and the first image data reflected on the second substrate 112 are input to the image pickup device 110 through the substrate respectively. In this case, the shapes and positions between the first substrate 111 or the second substrate 112 and the image pickup device 110 may be designed by taking account of a refraction factor between air and the substrate.

Note that the dual emission panel includes an EL layer sandwiched between first and second electrodes (corresponding to a cathode and anode of a light emitting element) each having light transmissivity. Therefore, light is emitted to both screen sides of the panel. Thus, circular polarizing plates may be disposed appropriately so as to prevent diffusion of external light due to a highly reflective wiring such as a signal line or a scan line.

In addition, when performing a black display on the dual emission panel, a polarizing plate or a circular polarizing plate may be disposed outside of the first substrate 111 and the second substrate 112 (opposite side of an EL layer) as needed although a case where the display screen (display plane) is relatively dark as compared to the external light can be disregarded. For example, a pair of polarizing plates may be disposed in crossed nicols, or a circular polarizing plate including a ¼ lambda plate and a polarizing plate may be disposed in crossed nicols to enhance contrast.

Alternatively, a polarizing plate or a circular polarizing plate may be disposed inside the first substrate 111 and the second substrate 112 (the EL layer side). In this case, an opening is formed in the polarizing plate or the circular polarizing plate at the corresponding position to the reflector in order to obtain reflection by the reflector.

The pair of the polarizing plates may be disposed with their optical axes (absorption axes and transmission axes thereof) moved in some measure to come off crossed nicols so as to enhance contrast while securing enough light transmissivity.

Furthermore, it is also possible to apply an anti-glare treatment for reducing the glare (caused by light reflecting on the panel) by forming minute concavity and convexity on the surface of the panel to diffuse the reflected light or an anti-reflective coating using an anti-reflection film. In addition, a hard-coat treatment may be also applied against external shocks and scratches.

The dual emission panel according to this embodiment mode integrates a pixel portion having an EL layer, a signal line driver circuit portion and a scan line driver circuit portion as driver circuit portions. Note that the pixel portion and the driver circuit portions are not necessarily integrated. The signal line driver circuit portion and the scan line driver circuit portion may be formed by IC chips and connected to the pixel portion by bump bonding as well. In particular, the signal line driver circuit portion may be formed by an IC chip, and connected to a wiring through an ACF (Anisotropic Conductive Film) or an FPC (Flexible Printed Circuit) board, or by using COF (Chip On Film) or TAB (Tape Automated Bonding).

The signal line driver circuit portion and the scan line driver circuit portion are connected to external circuits through a connection terminal such as an ACF (Anisotropic Conductive Film) or an FPC (Flexible Printed Circuit) board, and signals are input therethrough. The external circuits include a power source circuit, a controller, an interface (I/F) portion or the like.

By implementing the quite lightweight and thin display panel and the image pickup device as described above, a small and compact portable phone having a shooting function can be provided. In addition, since there is no need to dispose anything which interrupts the user's view between the dual emission panel and the user, it is possible to shoot an image of a user as an object and to display an image to be viewed by the user on a display screen (display plane) at the same time.

As a reflector in this embodiment mode, multiple small mirrors may be disposed as well.

The portable phone in this embodiment mode can be applied to a two-way communication system which is used for two-way communication. When carrying out two-way communication, image display and image shooting can be performed at the same time while securing an eye focus of the user who is viewing the displayed image.

Note that the image pickup device 110 may be set to face either the user side or the opposite side thereof even in carrying out two-way communication. For example, when two-way communication is carried out with the image pickup device 110 facing the opposite side, two-way communication can be carried out including a third party, in addition to the user and the other party, who is directly communicating with the user while recognizing an image displayed on the dual emission panel. That means, by implementing the dual emission panel, two-way communication can be carried out including the third person while being recognized by other two parties.

Besides the two-way communication, a user can shoot an image of himself while seeing the displayed image of himself on the display panel. At this time, a high-quality image can be shot while securing an eye focus of the user even if he is viewing his own image.

Embodiment Mode 2

Described in this embodiment mode is a portable phone having a dual emission display panel as an example of a display device having an image pickup function, which has a different structure from that in Embodiment Mode 1.

Figure 8A:
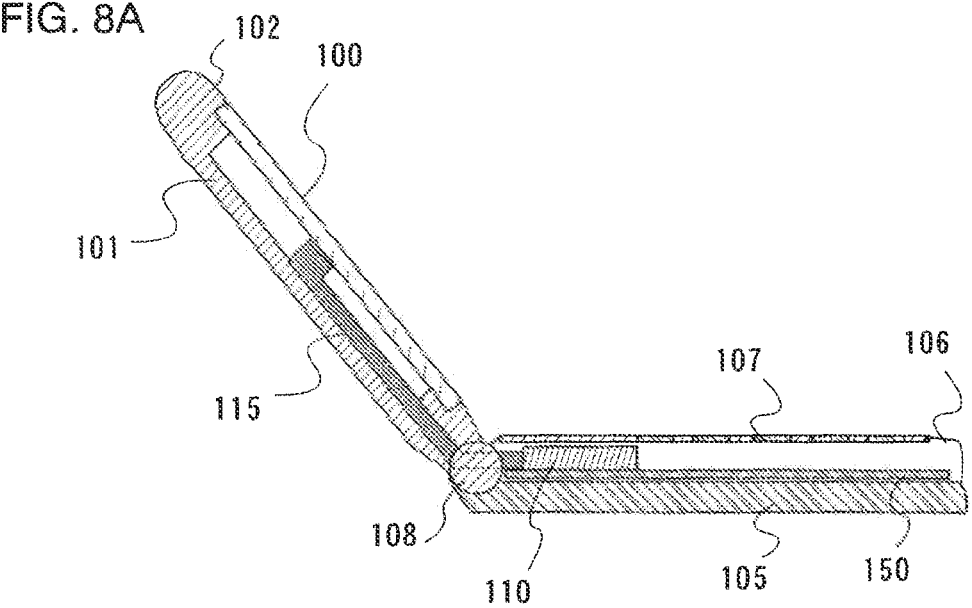
FIG. 8A illustrates a portable phone of the invention.

As shown in FIG. 8A, the first housing 101 in this embodiment mode includes a fiberscope 115 for image data input. That is, a lens (objective lens) of the fiberscope 115 is disposed in the rear (on the back) of the dual emission panel 100 in the first housing 101. The fiberscope 115 is led out to the second housing 105 through the hinge 108 so as to be connected to the image pickup device 110. Note that the image pickup device 110 may be disposed in the first housing 101 as well. That is, a fiberscope for transmitting an image to the image pickup device 110 through a lens may be used as shown in FIG. 8A. In addition, the diameter, the number of lenses, or the position of the fiberscope 115 may be set appropriately.

The second housing 105 includes a wiring board such as a printed wiring board 150 mounted with the image pickup device 110, a controller 151, a power supply circuit 152, an I/F (interface) 154 or the like. Various signals and power supply voltages supplied to the I/F 154 are supplied to the controller 151 and the power supply circuit 152.

Figure 8B:
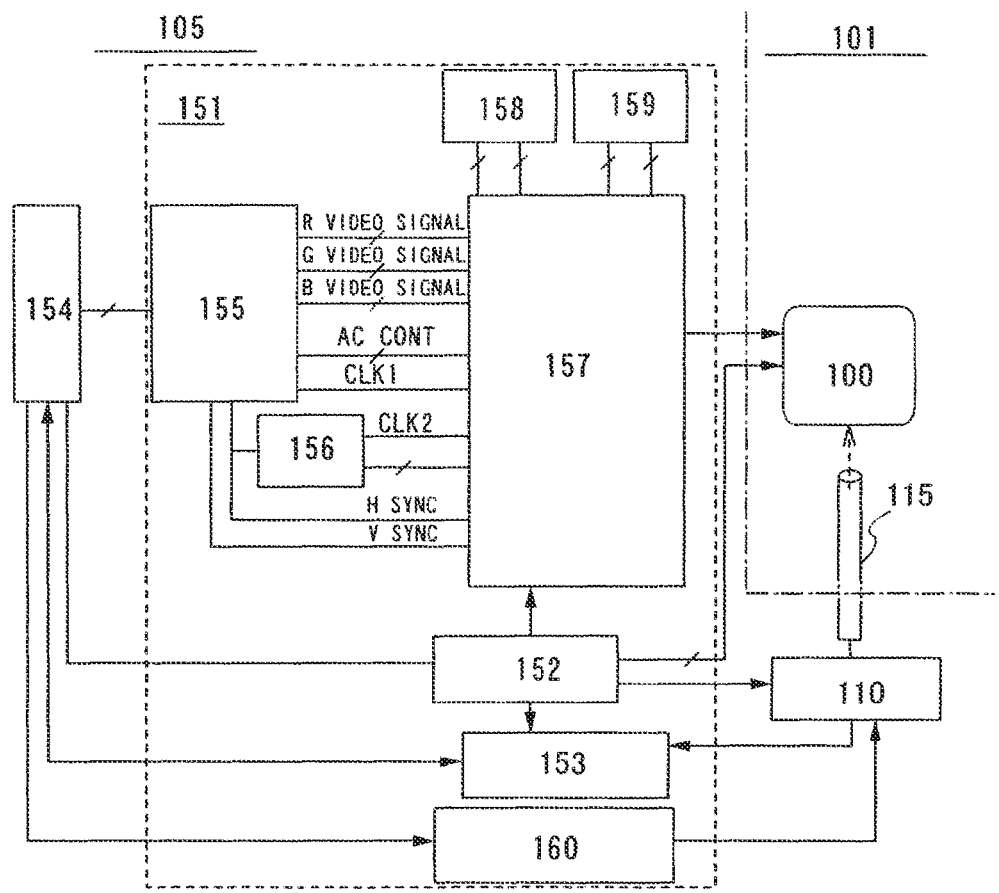
FIG. 8B illustrates a configuration diagram of a controller.

FIG. 8B illustrates a configuration of the controller 151. The controller 151 includes an A/D converter 155, a PLL (Phase Locked Loop) 156, a control signal generating circuit 157, an SRAM1 (Static Random Access Memory) 158 and an SRAM2 159, a control signal generating circuit 160 for the image pickup device 110 and an image processing circuit 153. Although SRAMs are used in this embodiment mode, SDRAMs (Synchronous DRAMs) and DRAMs (Dynamic Random Access Memories) can be used instead if high-speed data writing or reading can be performed.

Video signals supplied through the I/F (interface) 154 are serial-to-parallel converted in the A/D converter 155, and input to the control signal generating circuit 157 as video signals corresponding to each color of RGB. Based on the various signals supplied through the I/F 154, Hsync signals, Vsync signals, clock signals (CLK) and alternating voltages (AC Cont) are generated in the A/D converter 155, and then input to the control signal generating circuit 157.

The PLL 156 has a function to adjust the frequency of various signals supplied through the interface 154 to match the operating frequency of the control signal generating circuit 157 in phase. Although the operating frequency of the control signal generating circuit 157 is not necessarily equal to the frequency of various signals supplied through the interface 154, they are adjusted in the PLL 156 so as to be synchronized with each other.

The video signals input to the control signal generating circuit 157 are once written into the SRAM1 158 and the SRAM2 159 and stored therein. The control signal generating circuit 157 reads out video signals bit by bit which correspond to all the pixels among the signals for all bits stored in the SRAM1 158 and the SRAM2, and then supplies them to a signal line driver circuit of the dual emission panel 100.

In addition, the control signal generating circuit 157 supplies data for each bit regarding an emission period of a light emitting element to a scan line driver circuit of the dual emission panel 100.

Image data from the fiberscope 115 is input to the image pickup device 110, and then processed in the image processing circuit 153. The signals processed in the image processing circuit 153 are input to the interface 154, and then input to the image pickup device 110 through the control signal generating circuit 160 for the image pickup device 110.

The power supply circuit 152 also supplies a predetermined power supply voltage to the signal line driver circuit, the scan line driver circuit and the pixel portion of the dual emission panel 100.

According to this embodiment mode, the image pickup device can be disposed around the display panel (upper side, lower side or the like). Therefore, downsizing of the device can be achieved.

The portable phone in this embodiment mode can be applied to a two-way communication system. When carrying out two-way communication, image display and image shooting can be performed at the same time while securing an eye focus of a user who is viewing the displayed image.

Note that the image pickup device 110 may be set to face either the user side or the opposite side thereof even in carrying out two-way communication. For example, when two-way communication is carried out with the image pickup device 110 facing the opposite side, two-way communication can be carried out including a third party, in addition to the user and the other party, who is directly communicating with the user while recognizing an image displayed on the dual emission panel. That means, by implementing the dual emission panel, two-way communication can be carried out including the third person while being recognized by two other parties.

Besides the two-way communication, a user can shoot an image of himself while seeing the displayed image of himself on the display panel. At this time, a high-quality image can be shot while securing an eye focus of the user even if he is viewing his own image.

Embodiment Mode 3

Described in this embodiment mode is a videophone system having a dual emission display panel as an example of a display device having an image-pickup function.

FIG. 2A illustrates an overall view of a videophone system which includes a display panel 207 having a first substrate 200, a second substrate 201 and an EL layer area 202 sandwiched between them, and an image pickup device 203 disposed at the bottom of the display panel 207.

When a user 205 faces the display panel 207 which displays an image of the other party 206, they can communicate while catching each other's eyes.

In the image pickup device 203, a microlens for condensing image data which is reflected by a reflector is disposed in conformity with the size of the display panel 207 as a lens of the image pickup device.

Figure 2B:
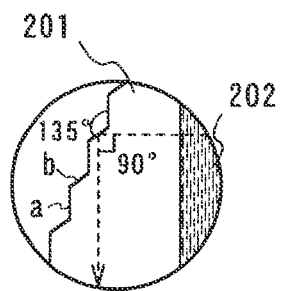
FIGS. 2B and 2C each illustrates an enlarged view of the videophone system of the invention.
Figure 2C:
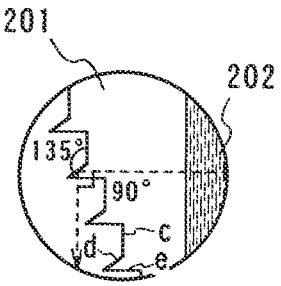

FIGS. 2B and 2C each illustrates an enlarged view of the display panel 207. Each figure shows a structure of the second substrate formed with depressions and projections as in FIGS. 1C and 1D, on part of which a reflector is formed. Through the reflector, image data of the user 205 is input to the image pickup device.

As a reflector, multiple small mirrors or half mirrors may be disposed.

Since the image pickup device is not required to be disposed in the rear of the display panel 207 in the videophone system as described above, further downsizing can be achieved.

Figure 3A:
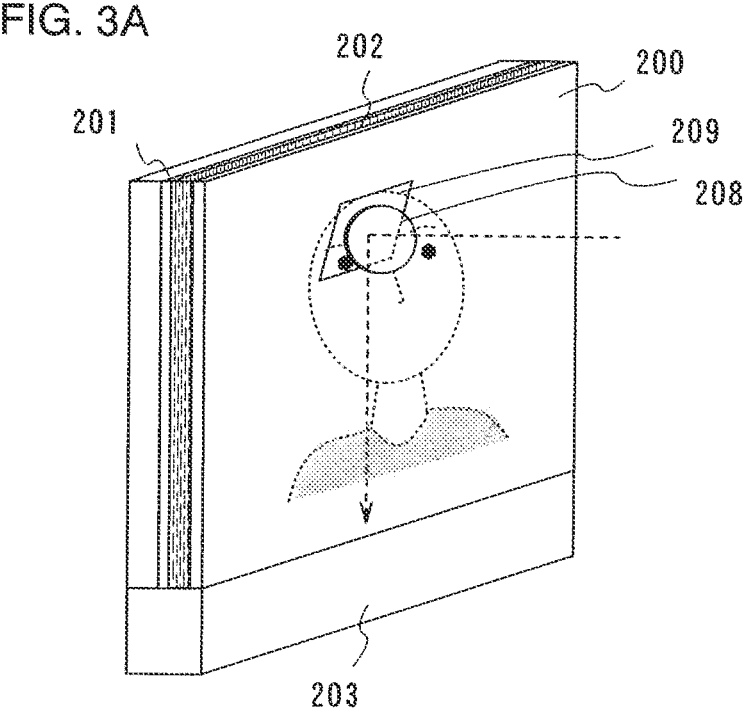
FIGS. 3A and 3B each illustrates a videophone system of the invention.

FIG. 3A illustrates a videophone system having a different structure from that in FIG. 2A, in which a lens 208 and a reflector 209 are disposed in the rear of the second substrate 201. For example, a microlens may be used as the lens 208 while a mirror may be used as the reflector 209.

Figure 3B:
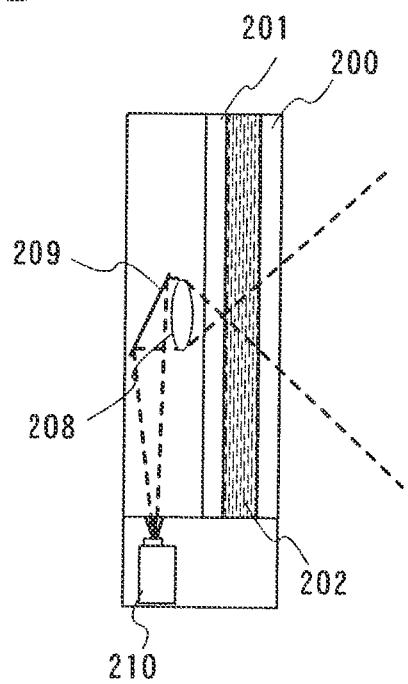

Referring to a cross-sectional diagram of the videophone system shown in FIG. 3B, the lens 208 condenses image data of a user and input it to the reflector 209. The image data is then input to an image pickup device 210 from the reflector 209.

At this time, the shooting range can be widened as compared to the sizes of the lens 208 and the reflector 209 by adjusting a focus of the lens 208. Therefore, a size of the videophone system such as a depth in particular is not increased even when the lens 208 having a relatively small size compared to the display panel and the reflector 209 having about the same size as the lens 208 are disposed in the rear of the display panel.

By using an optical system for condensing image data of an object in this manner, downsizing of a videophone system is achieved.

By implementing the quite lightweight and thin display panel and the image pickup device as described above, a compact and lightweight portable videophone can be provided. In addition, since there is no need to dispose anything which interrupts the user's view between the dual emission panel and the user, it is possible to shoot an image of an object (user, for example) and to display an image to be viewed by the user on a display screen (display plane) at the same time.

The videophone in this embodiment mode can be applied to a two-way communication system which is used for two-way communication. When carrying out two-way communication, image display and image shooting can be performed at the same time while securing an eye focus of a user who is viewing the displayed image.

Embodiment Mode 4

Described in this embodiment mode is a method for fabricating a display device having an image pickup function, and in particular, a method for fabricating a substrate having depressions and projections.

Figure 4A:
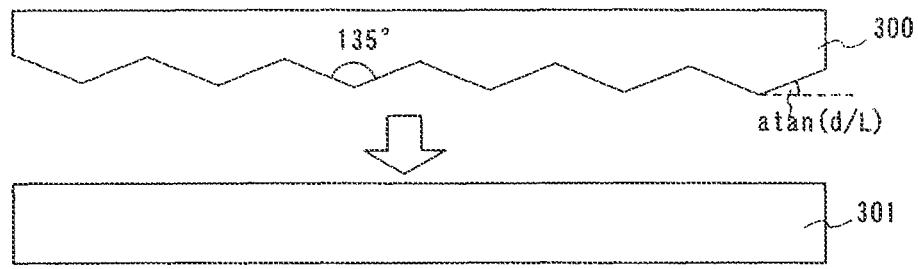
FIGS. 4A to 4E each illustrates a cross-sectional diagram of a dual emission display panel.

As shown in FIG. 4A, a metal mold 300 having depressions and projections is formed first. For example, when forming the substrate having depressions and projections as shown in FIG. 1C, an angle of the projection is formed to have 135 degrees. An angle made by the projection with a surface having no depressions nor projections is denoted by a tan (d/L). Alternatively, a metal mold having depressions and projections as shown in FIG. 1D may be prepared as well. An organic material may be poured into the metal mold 300 to form the second substrate having depressions and projections. In addition, the second substrate having depressions and projections may be formed by whittling away a substrate using the metal mold 300.

Figure 4B:

In this manner, a second substrate 301 having depressions and projections as shown in FIG. 4B is formed. As the second substrate 301, a glass substrate made of barium borosilicate glass or alumino borosilicate glass, a quartz substrate, an SUS substrate or the like may be used. Alternatively, a synthetic resin substrate having flexibility such as a plastic substrate typified by PET (Polyethylene Terephthalate), PES (Polyether Sulfone) or PEN (Polyethylene Naphthalate) and an acrylic substrate can be used as long as it can withstand the processing temperatures during the manufacturing steps although it generally has a lower heat resistance temperature as compared to other substrates. Note that in the case using a substrate formed of an organic material such as synthetic resin, the second substrate may be formed by pouring the material into the metal mold 300. Meanwhile in the case of using a glass substrate, a quartz substrate, an SUS substrate or the like, the second substrate may be formed by whittling the substrate away using the metal mold 300.

Figure 4C:

Subsequently, a mirror surface processing is applied by forming a metal film on the depressions and projections only in one direction as shown in FIG. 4C. Specifically, the metal film is formed by applying vapor deposition or sputtering in one direction. At this time, an electric field may be applied in order to control the deposition direction of the metal film.

Figure 4D:
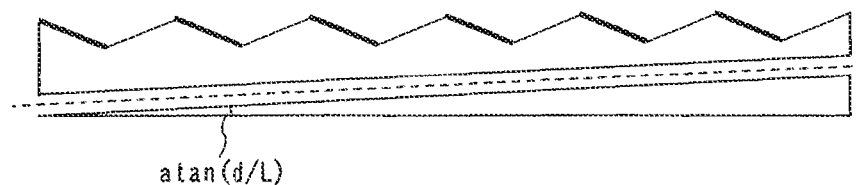

Then, a second substrate 301 is cut off as shown in FIG. 4D with respect to the surface having no depressions nor projections at an angle of a tan (d/L).

Figure 4E:
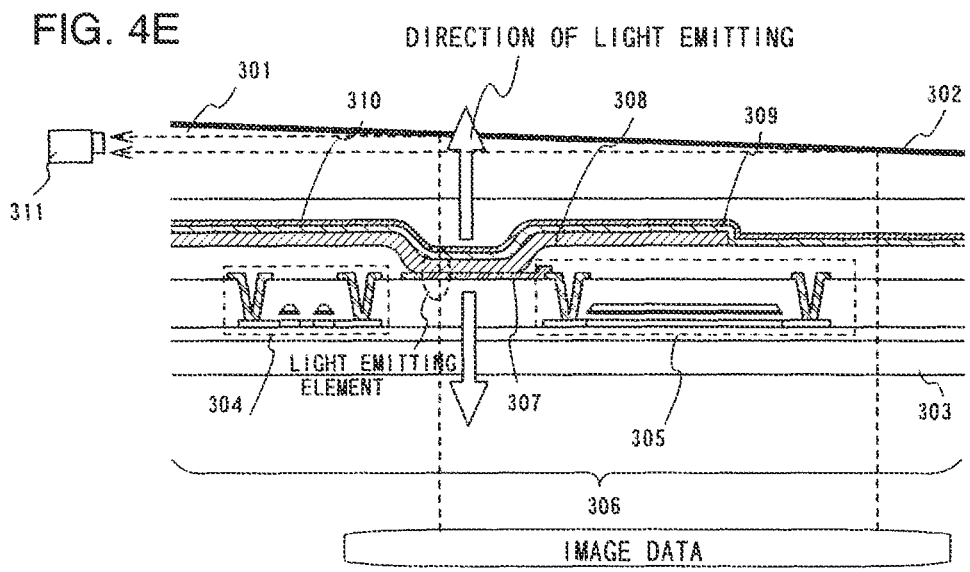

The second substrate 301 formed like the above manner is used as a sealing substrate. That is, as shown in an enlarged cross-sectional diagram of a pixel in FIG. 4E, the second substrate 301 having depressions and projections is attached onto the pixel portion 306 by a sealant. The pixel portion 306 includes a switching transistor 304 and a driving transistor 305 formed on the first substrate 303, a first electrode 307 of a light emitting element connected to a first electrode of the driving transistor 305, an EL layer 308 formed over the first electrode 307, a second electrode 309 of the light emitting element formed over the EL layer 308 and a protective film 310 formed over the second electrode 309.

The image data is input to the image-pickup device 311 after being reflected by a reflector 302 disposed on the second substrate. Note that since image data is input from a light emitting area as well, image corrections as described in Embodiment Mode 6 are preferably performed. In addition, the size of the depressions and projections of the second substrate in actuality is quite large relatively to the size of one pixel.

Described now is the EL layer 308. In the EL layer 308, an HIL (Hole Injection Layer), an HTL (Hole Transporting Layer), an EML (EMmitting Layer), an ETL (Electron Transporting layer) and an EIL (Electron Injection Layer) are laminated in this order from the anode side. Typically, CuPc is used for the HIL, a-NPD is used for the HTL, BCP is used for the ETL and BCP: Li is used for the EIL.

In addition, in the case of performing a full color display, materials each emitting red (R), green (G) or blue (B) light may be selectively deposited as the EL layer 308 by vapor deposition using a deposition mask or by ink-jet printing. Specifically, CuPc or PEDOT is used for the HIL, a-NPD is used for the HTL, BCP or Alq$_3$ is used for the ETL and BCP: Li or CaF$_2$ is used for the EIL. As for the EML, for example, Alq$_3$ doped with dopant corresponding to each emission color of RGB (DCM and the like for R, and DMQD and the like for G) may be used. Note that the invention is not limited to the laminate structure of the aforementioned EL layer 308.

The specific laminate structure of the EL layer 308 is described now. In the case of forming the EL layer 308 for red emission for example, CuPc having a thickness of 30 nm and a-NPD having a thickness of 60 nm are sequentially deposited. Then, by using the same mask, Alq$_3$ having a thickness of 40 nm which is doped with DCM$_2$ and rubrene as a red EML, BCP having a thickness of 40 nm as an ETL and BCP having a thickness of 1 nm which is doped with Li as an EIL are sequentially deposited. In the case of forming the EL layer 308 for green emission for example, CuPc having a thickness of 30 nm and a-NPD having a thickness of 60 nm are sequentially deposited. Then, by using the same mask, Alq$_3$ having a thickness of 40 nm which is doped with coumarin 545T as a green EML, BCP having a thickness of 40 nm as an ETL and BCP having a thickness of 1 nm which is doped with Li as an EIL are sequentially deposited. In the case of forming the EL layer 308 for blue emission for example, CuPc having a thickness of 30 nm and a-NPD having a thickness of 60 nm are sequentially deposited. Then, by using the same mask, bis[2-(2-hydroxyphenyl)-benzoxazolato]zinc: Zn(PBO)$_2$ having a thickness of 10 nm as a blue EML, BCP having a thickness of 40 nm as an ETL, and BCP having a thickness of 1 nm which is doped with Li as an EIL are sequentially deposited.

As described above, CuPc and a-NPD can be used in common to form the EL layer for each color over the entire pixel portion. In addition, the same mask can be used for each color EML for each color in such a manner that a mask is moved after forming the red EML to form the green EML, and then, it is moved again to form the blue EML. The laminate order of the EL layer for each color may be set appropriately.

In addition, in the case of white light emission, a full color display may be performed by additionally providing color filters, or color filters and color conversion layers. The color filters and the color conversion layers are formed on the second substrate, and the first substrate and second substrate may be attached to each other.

The first electrode 307 and the second electrode 309 may be formed by using light-transmitting materials. Therefore, light from the light emitting element is emitted in the both directions of the first substrate 303 and the second substrate 301. That is, the light emitted from the light emitting element can be recognized from either side of the first substrate 303 or the second substrate 301. In other words, the light emitted from the light emitting element can be recognized even in an area having no reflector of the second substrate 301, namely in the light-transmitting area. In addition, an image of an object disposed on the first substrate 303 side is input to the image pickup device 311 after being reflected on the reflector of the second substrate 301.

Materials for forming the first electrode 307 and the second electrode 309 of the light emitting element may be selected by taking account of its work function. In this embodiment mode, the first electrode 307 and the second electrode 309 are assumed to be an anode and a cathode respectively.

As for the anodic material, it is preferable to use a metal having a large work function (4.0 eV or more), an alloy, an electrically conductive compound, a mixture of them or the like. Specifically, indium tin oxide (ITO), indium zinc oxide (IZO) in which 2 to 20% of zinc oxide (ZnO) is mixed with indium oxide, gold (Au), platinum (Pt), nickel (Ni), tungsten (W), chromium (Cr), molybdenum (Mo), iron (Fe), cobalt (Co), copper (Cu), palladium (Pd), nitride metal materials (MN) or the like can be used.

As for the cathodic material, it is preferable to use a metal having a small work function (3.8 eV or less), an alloy, an electrically conductive compound, a mixture of them or the like. For example, elements that belong to the first group or the second group of a periodic table, namely alkali metals such as Li and Cs, and alkaline earth metals such as Mg, Ca and Sr, alloys including these elements (Mg:Ag, Al:Li), chemical compounds including these elements (LiF, CsF, CaF$_2$) and in addition, transition metals including rare earth metals can be used. However, since the cathode is required to have light transmissivity, it is formed extremely thin by using these metals or an alloy including these metals, and laminated with a metal such as ITO (including alloys). These anode and cathode may be formed by vapor deposition, sputtering or the like.

According to the pixel structure described above, either the first electrode 307 or the second electrode 309 can be used as an anode or a cathode. For example, it is possible that the driving transistor has an N-type polarity, the first electrode is the cathode, and the second electrode is the anode.

In addition, the protective film 310 is deposited by sputtering or CVD to block out moisture and oxygen. It is possible to fill nitrogen or place a drying agent in the space provided between the protective film 310 and the second substrate 301 at this time. Furthermore, a hygroscopic organic material may be filled in the space instead.

Figure 5A:
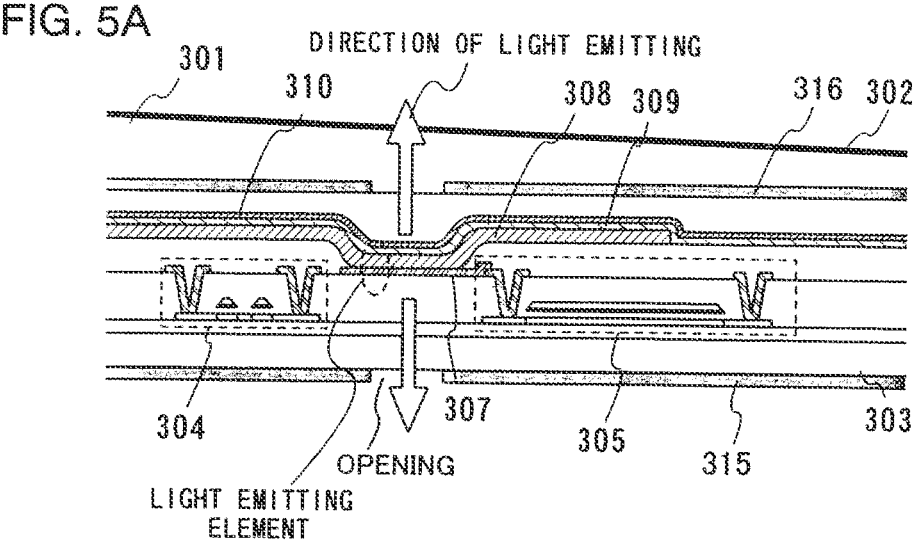
FIGS. 5A and 5B each illustrates a cross-sectional diagram of a dual emission display panel.

In addition, when disposing a polarizing plate or a circular polarizing plate as shown in FIG. 5A, a first polarizing plate (first circular polarizing plate) 315 is disposed outside the first substrate 303 (opposite side of the light emitting element) while a second polarizing plate (second circular polarizing plate) 316 is disposed on the side having the light emitting element on the second substrate 301 having depressions and projections. At this time, an opening is formed on each of the first polarizing plate 315 or the second polarizing plate 316 in order to input image data to the reflector. The opening is formed in every pixel, and it is preferable that the opening is formed at least in an area facing the reflector. The number, the shape or the position of the openings may be designed appropriately.

Figure 5B:
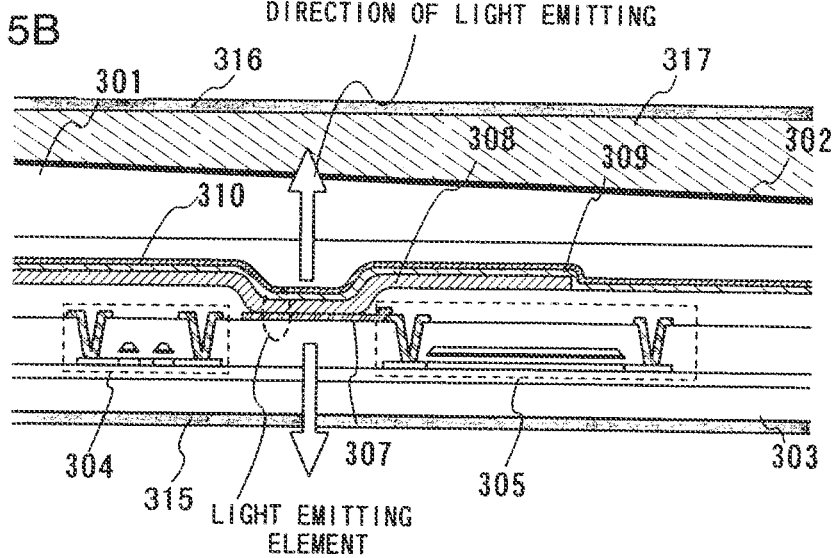

Alternatively as shown in FIG. 5B, a planarizing film 317 may be formed by using acrylic or an organic material such as polyimide over the second substrate 301 having depressions and projections, and the second polarizing plate 316 may be disposed outside the planarizing film 317 (the opposite side of the light emitting element). In this case, each of the first polarizing plate 315 and the second poalrizing plate 316 is not required to have an opening, however, it may be formed in an area facing the reflector.

In FIGS. 5A and 5B, the first polarizing plate 315 and the second planarizing plate 316 are disposed in crossed nicols. Alternatively, in the case of using a circular polarizing plate including a ¼ lambda plate and a polarizing plate, these polarizing plates are disposed to be in crossed nicols. However, they may come off the crossed nicols within a range of 10 degrees.

By disposing the polarizing plate or the circular polarizing plate in the above manner, contrast of the display panel can be enhanced.

The display panel fabricated in this manner is quite thin and light, therefore, downsizing of the panel can be achieved.

Such a display device having an image pickup function can be implemented with other embodiment modes described above. That is, the display device having an image pickup function fabricated as in this embodiment mode can be mounted on a portable phone or a videophone system.

Embodiment Mode 5

Described in this embodiment mode is an example of forming a display device having an image pickup function by using a display panel (liquid crystal panel) having liquid crystal elements.

Figure 11A:
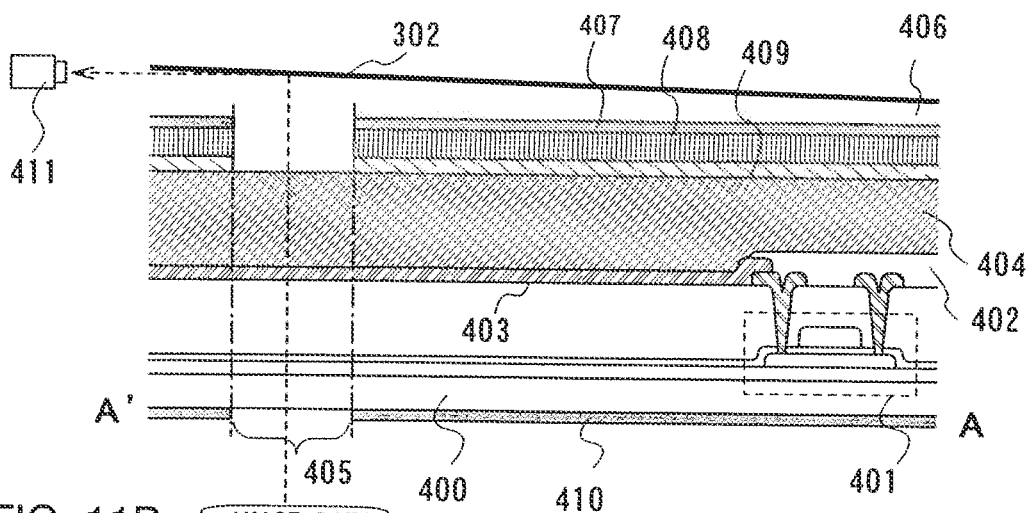
FIG. 11A illustrates a cross-sectional diagram of a liquid crystal panel of the invention.

As shown in FIG. 11A, a P-channel driving TFT 401 disposed over a light-transmitting substrate 400 has a crystalline semiconductor film which is applied crystallization by laser irradiation or heat treatment, or by using catalysis of metal elements such as nickel or titanium. A gate electrode and a gate line are formed over the semiconductor layer with a gate insulating layer interposed therebetween, and the semiconductor layer under the gate electrode corresponds to a channel forming region. Impurity elements such as boron are added to the semiconductor layer in a self-aligned manner by using the gate electrode as a mask, thus impurity regions of a source region and a drain region are obtained. A first insulating layer is formed so as to cover the gate electrode, and contact holes are formed in the first insulating layer on the impurity regions. The contact holes are formed with wirings which function as a source wiring and a drain wiring. Note that influences of concavity and convexity of a source wiring, a drain wiring and other wirings are reduced and a constant voltage is applied to a liquid crystal layer 404. Therefore, a planarizing film 402 is preferably formed by using an organic material.

A pixel electrode 403 is disposed so as to be electrically connected to the drain electrode. Over the pixel electrode 403, an orientation film (not shown) is disposed, and then processed by rubbing. In this embodiment mode, the pixel electrode 403 is formed of a light-transmitting conductive film such as ITO.

As in Embodiment Mode 4, the second substrate formed with the reflector 302 is prepared as an opposed substrate 406 of the liquid crystal panel. The opposed substrate 406 is formed with a polarizing plate (second polarizing plate) 407, a color filter 408 and an opposed electrode 409 in this order. Over the opposed electrode 409, an orientation film (not shown) is disposed, and then processed by rubbing.

The first substrate 400 is attached to the second substrate 406 with the liquid crystal layer 404 injected between them. The liquid crystal layer 404 is desirably injected in vacuum. Alternatively, the liquid crystal layer 404 may be dropped on the first substrate 400, and then the second substrate 406 may be attached thereto. When using a large substrate in particular, dropping is more suitable than injection to fill the liquid crystal layer 404. Subsequently, a polarizing plate (first polarizing plate) 410 is formed in the first substrate 400 side.

In such a liquid crystal display panel, an opening area 405 is formed so as to transmit image data. The image data is input to an image pickup device 411 after passing through the opening area 405 and being reflected by the reflector 302. Therefore, it is preferable that the opening area is formed in every pixel in order to increase light-transmittancy. The shape or the number of the opening areas may be designed appropriately. For example, multiple small opening areas may be formed in every pixel. Furthermore, the number or the area of the opening areas can be reduced by enhancing a sensitivity of the image pickup device 411 or performing image corrections.

Figure 11B:
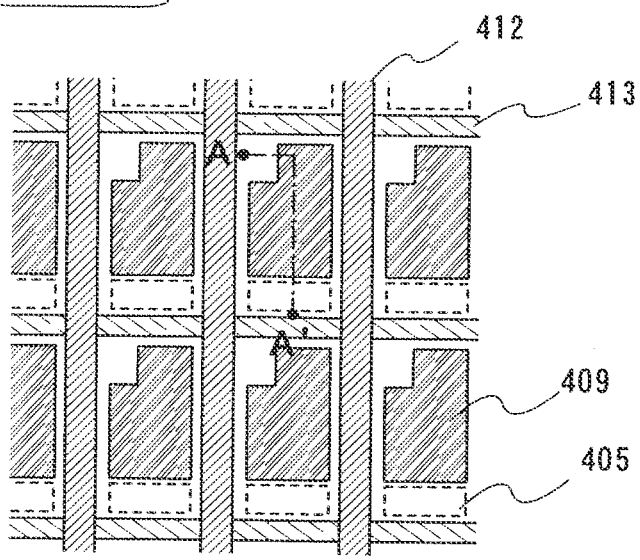
FIGS. 11B and 11C each illustrates a top plan view of the liquid crystal panel of the invention.
Figure 11C:
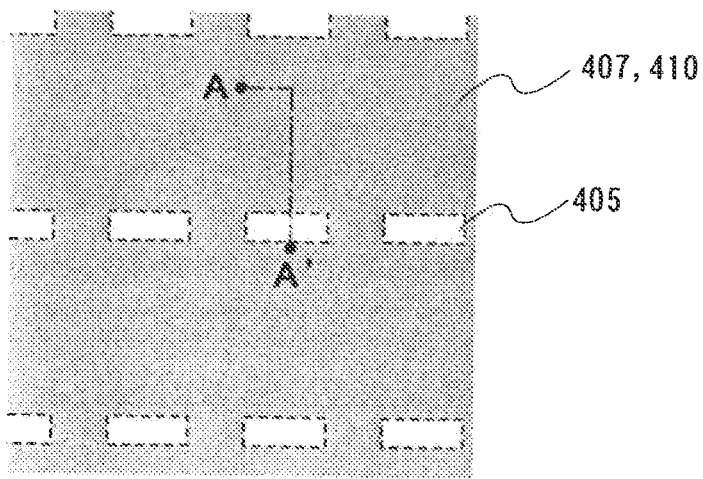

In the opening area 405, an opening (also referred to as an opening area) is formed in the non-light transmitting film. Therefore, an opening portion is formed by patterning each of the opposed electrode 409, the color filter 408 and the polarizing plates 407 and 410. FIG. 11B illustrates a top plan view of the liquid crystal panel, in which the opposed electrode 409 and the opening area 405 are formed at an intersection of a signal line 412 and a scan line 413. FIG. 11C includes polarizing plates 407 and 410. An opening is formed corresponding to the opening area 405. Note that FIG. 11A is a cross-sectional diagram of each of the top plan views in FIGS. 11B and 11C taken along a line A-A.

In addition, the opening may be formed even when the pixel electrode 403 is formed by a light-transmitting conductive film (such as ITO). A part of the liquid crystal layer 404 corresponding to the opening is a light-transmitting area since it includes no opposed electrode 409 or no pixel electrode 403, and no voltage is applied thereto.

Furthermore, it is also possible to form a light-transmitting conductive film in the opening area 405. At this time, the light-transmitting conductive film may be input an electronic signal which is different from the pixel electrode 403 and the opposed electrode 409, thereby controlling molecules in the liquid crystal layer 404 in order to maintain the light-tranmissivity all the time. In addition, a lambda/2 plate may be disposed on the polarizing plate within the opening area 405.

By forming the opening in the opening area 405 to obtain light-transmisisvity in this manner, a display device having an image pickup function can be provided by using a liquid crystal panel.

In addition, as a liqcuid crystal material, TN (Twist Nematic) liquid crystal, STN (Super Twist Nematic) liquid crystal or non-twist mode nematic liquid crystal using double refraction can be used. Alternatively, a liquid crystal material which requires no polarizing plate such as polymer dispersed liquid crystal (PDLC) or guest-host (GH) mode liquid crystal can used, in which ferroelectric liquid crystal, nematic liquid crystal, cholesteric liquid crystal or the like is dispersed in polymer.

As for the liquid crystal panel, either a light-transmitting liquid crystal panel, a reflective liquid crystal panel or a semi-light transmitting liquid crystal panel can be used. In particular, in the case of fabricating a light-transmitting liquid crystal panel, the pixel electrode 403 is formed of a light-transmitting conductive film. Therefore, the pixel electrode is not required to have an opening. Meanwhile in the case of fabricating a reflective liquid crystal panel, the pixel electrode is formed of a reflective conductive film. Therefore, the pixel electrode is required to have an opening.

Figure 12:
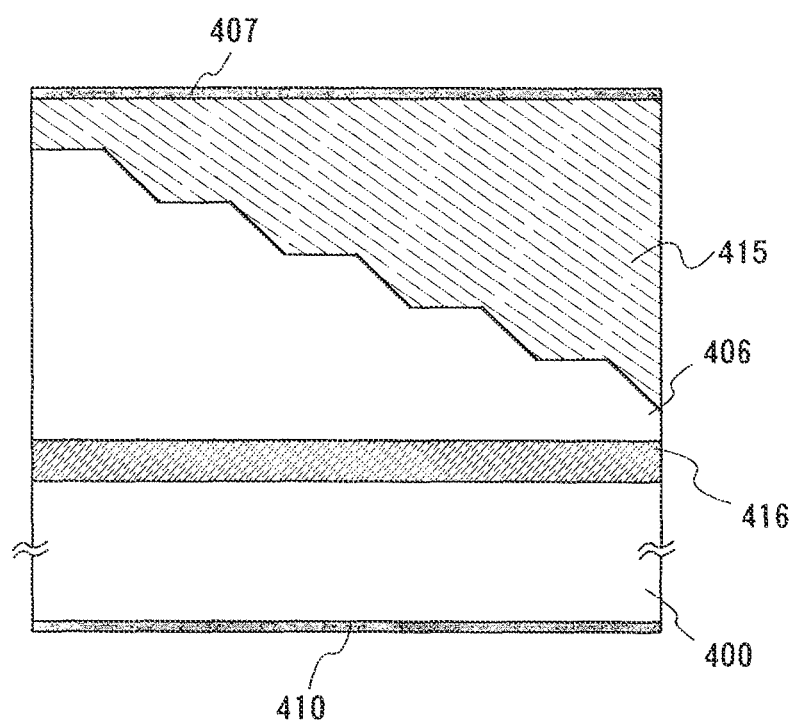
FIG. 12 illustrates a cross-sectional diagram of a liquid crystal display panel of the invention.

FIG. 12 illustrates a liquid crystal display panel in which the position of the second polarizing plate 407 is different. Over the second substrate having depressions and projections, a planarizing film 415 is formed by using an organic light-transmitting material such as acryl or polyimide. Then, the second polarizing plate 407 is disposed over the planarizing film 415. Note that the liquid crystal layer area 416 in FIG. 12 includes the driving TFT 401, the planarizing film 402, the pixel electrode 403, the liquid crystal layer 404, the opposed electrode 409 and the color filter 408 each formed over the first substrate 400.

In addition, an opening area may be formed in the display panel having light emitting elements shown in Embodiment Mode 4 as well. For example, an opening may be formed in the first electrode or the second electrode of the light emitting element, or in the polarizing plate or the circular polarizing plate which is disposed appropriately.

The display panel fabricated in this manner is quite thin and light, therefore, downsizing of the panel can be achieved.

Such a display device having an image pickup function can be implemented with other embodiment modes described above. That is, the display device having an image pickup function fabricated as in this embodiment mode can be mounted on a portable phone or a videophone system.

Embodiment Mode 6

Figure 6A:
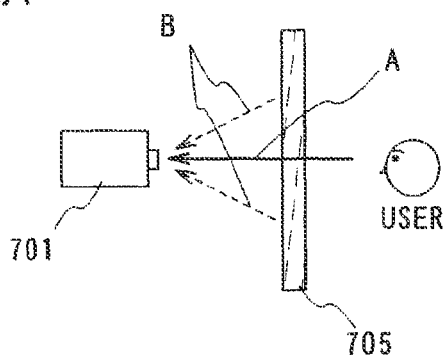
FIG. 6A illustrates image corrections of the invention.
Figure 6B:
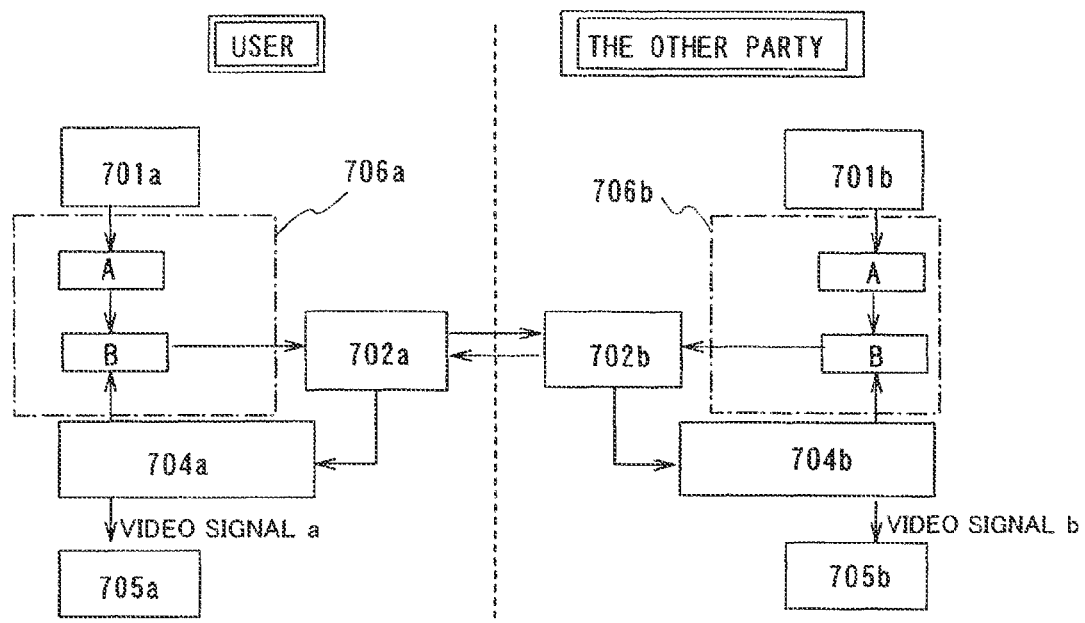
FIG. 6B illustrates a flow chart for image corrections of the invention.

Described in this embodiment mode is a method for correcting an image that is shot by the image pickup device described in Embodiment Modes 1 to 5 with reference to FIGS. 6A and 6B.

FIG. 6A illustrates an image pickup device 701, a display panel (dual emission panel for example) 705, a user, a correction A in which a deviation in color or luminance of an image is corrected corresponding to the light transmissivity of the panel and a correction B in which the glare caused by light reflecting on the display panel is eliminated from an image.

FIG. 6B illustrates a flow chart showing a two-way communication system between two parties. Described below is the case where each of the two parties has the identical two-way communication device.

In two-way communication, two parties communicate with each other through image pickup devices 701a and 701b, communication circuits 702a and 702b, image processing circuits 706a and 706b, display panel external circuits 704a and 704b, display panels 705a and 705b and communication circuits 702a and 702b. Each of the image processing circuits 706a and 706b has a function to perform the correction A and a function to perform the correction B, and each of them is controlled by the display panel external circuits 704a and 704b.

Each of the image pickup devices 701a and 701b shoots an image of the two parties through the display panels 705a and 705b. At this time, the correction A in which a deviation in color or luminance of an image is corrected corresponding to the light transmissivity of the panel is performed. Also, the correction B in which the glare caused by light reflecting on the display panel is eliminated from an image of the two parties is performed. As a result, correction of the images of the two parties are completed. Either the correction A or the correction B can precede or they may be performed at the same time. In addition, each of the correction A and the correction B may be performed by using the same correction circuit. The circuit for performing the correction A may be disposed either between the communication circuits 702a and 702b and the display panel external circuit 704 or between the display panel external circuit 704 and the display panel 705. Furthermore, in addition to the function to perform the correction B, a function for processing an image corresponding to a lens or focus may be performed, in which filtering process such as blurring and shrinking is applied to a component of the light emission from the display panels 705a and 705b.

Such corrected images are transmitted through the communication circuits 702a and 702b.

The images transmitted from the communication circuits 702a and 702b are input to the display panel external circuits 704a and 704b respectively, and then displayed on the display panels 705a and 705b. Specifically, video signals of corrected images a and b are input to signal lines disposed in the display panels 705a and 705b.

By using the corrected images a and b as described above, communication can be performed with high accuracy.

The method for correcting the images in this embodiment mode can be freely implemented with other Embodiment Modes described above. Thus, highly accurate two-way communication system can be provided.

Embodiment Mode 7

Figure 9A:
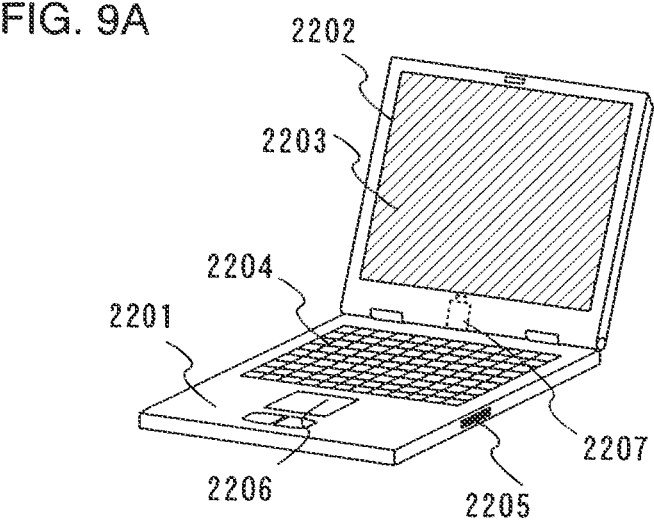
FIGS. 9A and 9B each illustrates a view of an electronic apparatus of the invention.
Figure 9B:
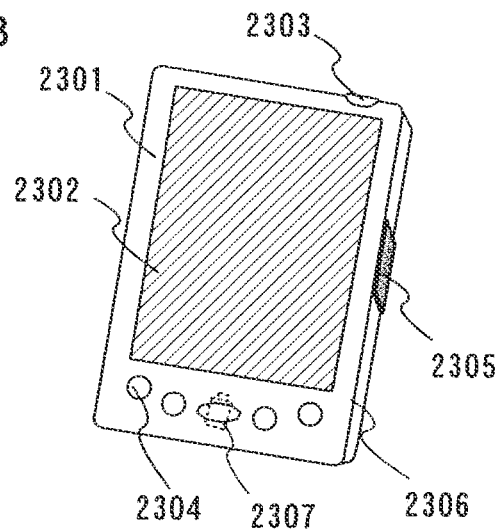

Examples of an electronic apparatus having the display panel mounting the substrate formed with depressions and projections or mounting a fiberscope of the invention include a digital camera, an audio device such as a car audio set, a notebook personal computer and an image reproducing device provided with a recording medium such as a home game player or the like. Specific examples of these electronic apparatuses are shown in FIGS. 9A and 9B. They show an operative example of electronic device/apparatus in FIG. 9.

FIG. 9A illustrates a notebook personal computer which includes a main body 2201, a housing 2202, a display portion 2203, a keyboard 2204, an external connecting port 2205, a pointing mouse 2206, an image pickup device 2207 inside the housing 2202 or the like. The display panel of the invention mounting the substrate formed with depressions and projections or mounting a fiberscope can be used in the display portion 2203. Thus, a two-way communication system using notebook personal computers can be provided.

FIG. 9B illustrates a mobile computer which includes a main body 2301, a display portion 2302, a switch 2303, an operating switch 2304, an infrared port 2305, an image pickup device 2307 inside the housing 2306 or the like. The display panel of the invention mounting the substrate formed with depressions and projections or mounting a fiberscope can be used in the display portion 2302. Thus, a two-way communication system using mobile computers can be provided.

In above described electronic apparatuses, by applying the display panel of the invention mounting the substrate formed with depressions and projections or mounting a fiberscope to the above electronic apparatuses, a two-way communication system in which two parties can communicate while catching each other's eyes can be provided.

Any one of Embodiment Modes as described above can be applied to the electronic apparatuses of this Embodiment Mode.

Embodiment

Embodiment 1

Described in this embodiment is a simulation result of a shooting range in the case of using the second substrate having depressions and projections shown in FIG. 1C.

Figure 7:
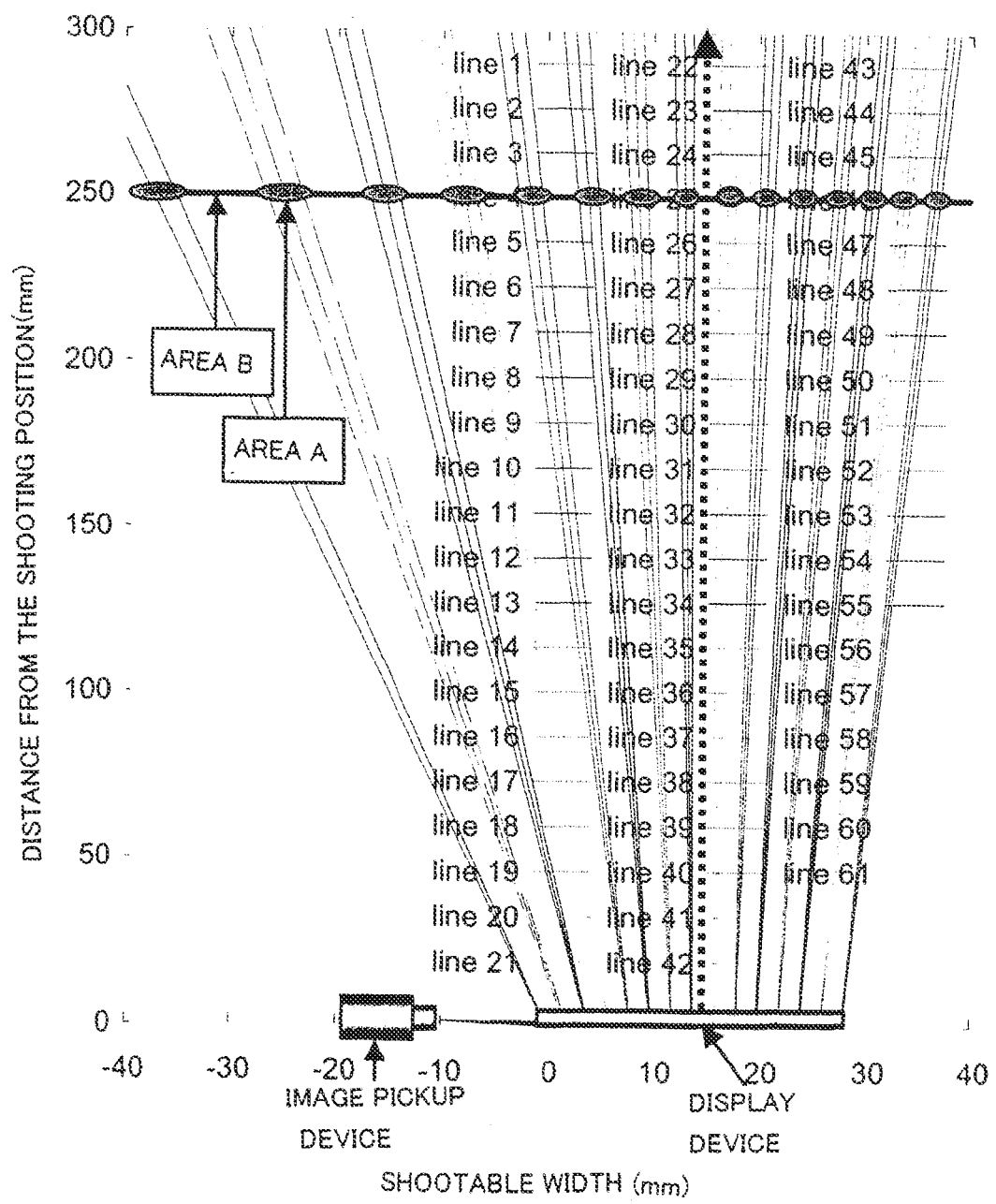
FIG. 7 illustrates a graph of a simulation result.

Referring to FIG. 7, X-axis denotes a shootable width (mm) while Y-axis denotes a distance from the shooting position, namely a distance between the display panel and an object (mm). In addition, a range in which an image can be input to the image pickup device through reflection by multiple reflectors is denoted by lines (line 1 to line 61).

FIG. 7 includes a shootable area A and a non-shootable area B. Each of the shootable area A and the non-shootable area B can be set by appropriately determining an angle, the shape, the number of reflectors, the position of the image pickup device, an optical system or the like.

Generally, an object to be shot is positioned to face the display portion. Therefore, the shootable area A desirably takes up the largest areas in front of the display surface as possible. Meanwhile, the non-shootable area B may desirably around the display panel, namely around the display portion. In addition, the non-shootable area B desirably performs an image-connecting processing and an interpolation processing by using the shootable area A.

An image passed through the shootable area A is inverted by a reflector and a range of the shootable area A varies according to the direction, resulting in variations in resolution of an image. For preventing this, filtering such as an image inverting processing is desirably performed. Furthermore, image correction for preventing a glare caused by light reflecting on the panel is desirably performed.

This application is based on Japanese Patent Application serial no. 2003-275185 filed in Japan Patent Office on 16, Jul. 2003, the contents of which are hereby incorporated by reference. Although the invention has been fully described by way of Embodiment Modes and Embodiments with reference to the accompanying drawings, it is to be understood that various changes and modifications will be apparent to those skilled in the art. Therefore, unless such changes and modifications depart from the scope of the invention hereinafter defined, they should be constructed as being included therein.

What is claimed is:

1. A display device comprising: a first substrate;
a pixel over the first substrate, the pixel comprising:
a thin film transistor; and
a pixel electrode over the thin film transistor, the pixel electrode being connected to the thin film transistor;
an organic material layer over the pixel electrode;
a second substrate over the organic material layer;
an optical system over the second substrate; and
a polarizer overlapping with the pixel,
wherein an image of an object is transmitted to an image pickup device through the first substrate, an opening in the pixel, the second substrate, and the optical system, and
wherein the polarizer includes an opening portion to transmit light.

2. The display device according to claim 1, wherein the organic material layer comprises a liquid crystal molecule.

3. The display device according to claim 1, wherein the organic material layer comprises a light-emitting layer.

4. A display device comprising:
a first substrate;
a thin film transistor over the first substrate;
a pixel electrode over the thin film transistor, the pixel electrode being connected to the thin film transistor;
an organic material layer over the pixel electrode;
a second substrate over the organic material layer;
a first polarizer beneath the first substrate;
a second polarizer over the second substrate; and
an optical system over the second polarizer,
wherein each of the first polarizer and the second polarizer includes an opening portion to transmit light, and
wherein an image of an object is transmitted to an image pickup device through the opening portion of the first polarizer, the first substrate, the second substrate, the opening portion of the second polarizer, and the optical system.

5. The display device according to claim 4, wherein the organic material layer comprises a liquid crystal molecule.

6. The display device according to claim 4, wherein the organic material layer comprises a light-emitting layer.

7. The display device according to claim 4, wherein at least one of the first polarizer and the second polarizer includes an circular polarizer.

8. A display device comprising:
a first substrate;
a thin film transistor over the first substrate;
a pixel electrode over the thin film transistor, the pixel electrode being connected to the thin film transistor;
an organic material layer over the pixel electrode;
a second substrate over the organic material layer; and
an optical system over the second substrate,
wherein the pixel electrode includes an opening portion to transmit light, and
wherein an image of an object is transmitted to an image pickup device through the first substrate, the opening portion of the pixel electrode, the second substrate, and the optical system.

9. The display device according to claim 8, wherein the organic material layer comprises a liquid crystal molecule.

10. The display device according to claim 8, wherein the organic material layer comprises a light-emitting layer.

11. The display device according to claim 8, further comprising:
a first polarizer beneath the first substrate; and
a second polarizer over the second substrate,
wherein each of the first polarizer and the second polarizer includes an opening portion to transmit light.

12. A display device comprising:
a first substrate;
a thin film transistor over the first substrate;
a pixel electrode over the thin film transistor, the pixel electrode being connected to the thin film transistor;
an organic material layer over the pixel electrode;
a colored layer over the organic material layer;
a second substrate over the organic material layer;
a first polarizer beneath the first substrate;
a second polarizer over the second substrate; and
an optical system over the second polarizer,
wherein the colored layer includes an opening portion to transmit light,
wherein each of the first polarizer and the second polarizer includes an opening portion to transmit light, and
wherein an image of an object is transmitted to an image pickup device through the opening portion of the first polarizer, the first substrate, the opening portion of the colored layer, the second substrate, the opening portion of the second polarizer, and the optical system.

13. The display device according to claim 12, wherein the organic material layer comprises a liquid crystal molecule.

14. The display device according to claim 12, wherein the organic material layer comprises a light-emitting layer.

15. The display device according to claim 12, wherein at least one of the first polarizer and the second polarizer includes an circular polarizer.

16. A display device comprising:
a first substrate;
a pixel over the first substrate, the pixel comprising:
a thin film transistor; and
a pixel electrode connected to the thin film transistor;
an organic material layer over the pixel electrode;
a second substrate over the organic material layer; and
a polarizer overlapping with the pixel,
wherein an image of an object is transmitted to an image pickup device through the first substrate, an opening in the pixel, and the second substrate, and
wherein the polarizer includes an opening portion to transmit light.

17. The display device according to claim 16, wherein the organic material layer comprises a liquid crystal molecule.

18. The display device according to claim 16, wherein the organic material layer comprises a light-emitting layer.

19. A display device comprising:
a first substrate;
a thin film transistor over the first substrate;
a pixel electrode over the thin film transistor, the pixel electrode being connected to the thin film transistor;
an organic material layer over the pixel electrode;
a second substrate over the organic material layer;
a first polarizer beneath the first substrate; and
a second polarizer over the second substrate,
wherein each of the first polarizer and the second polarizer includes an opening portion to transmit light, and
wherein an image of an object is transmitted to an image pickup device through the opening portion of the first polarizer, the first substrate, the second substrate, and the opening portion of the second polarizer.

20. The display device according to claim 19, wherein the organic material layer comprises a liquid crystal molecule.

21. The display device according to claim 19, wherein the organic material layer comprises a light-emitting layer.

22. The display device according to claim 19, wherein at least one of the first polarizer and the second polarizer includes an circular polarizer.

23. A display device comprising:
a first substrate;
a thin film transistor over the first substrate;
a pixel electrode connected to the thin film transistor;
an organic material layer over the pixel electrode; and
a second substrate over the organic material layer;
wherein the pixel electrode includes an opening portion to transmit light, and
wherein an image of an object is transmitted to an image pickup device through the first substrate, the opening portion of the pixel electrode, the second substrate.

24. The display device according to claim 23, wherein the organic material layer comprises a liquid crystal molecule.

25. The display device according to claim 23, wherein the organic material layer comprises a light-emitting layer.

26. The display device according to claim 23, further comprising:
a first polarizer beneath the first substrate; and
a second polarizer over the second substrate,
wherein each of the first polarizer and the second polarizer includes an opening portion to transmit light.

27. A display device comprising:
a first substrate;
a thin film transistor over the first substrate;
a pixel electrode connected to the thin film transistor;
an organic material layer over the pixel electrode;
a colored layer over the organic material layer;
a second substrate over the organic material layer;
a first polarizer beneath the first substrate; and
a second polarizer over the second substrate,
wherein the colored layer includes an opening portion to transmit light,
wherein each of the first polarizer and the second polarizer includes an opening portion to transmit light, and
wherein an image of an object is transmitted to an image pickup device through the opening portion of the first polarizer, the first substrate, the opening portion of the colored layer, the second substrate, and the opening portion of the second polarizer.

28. The display device according to claim 27, wherein the organic material layer comprises a liquid crystal molecule.

29. The display device according to claim 27, wherein the organic material layer comprises a light-emitting layer.

30. The display device according to claim 27, wherein at least one of the first polarizer and the second polarizer includes an circular polarizer.

31. A display device comprising:
a thin film transistor over an insulating surface;
an insulating film over the thin film transistor;
a first electrode over the thin film transistor, the first electrode being connected to the thin film transistor;
an organic material layer over the first electrode;
a second electrode over the organic material layer; and
a second substrate over the second electrode,
wherein the second electrode comprises an electrode portion and an opening portion,
wherein the electrode portion overlaps with the first electrode with the organic material layer interposed therebetween, and
wherein light transmits through the insulating surface, the organic material layer, the opening portion of the second electrode, and the second substrate.

32. The display device according to claim 31, wherein the organic material layer comprises a light-emitting layer.

33. The display device according to claim 31, wherein the second electrode comprises a material including aluminum.

34. The display device according to claim 31, wherein a color filter comprises a portion not overlapping with the opening portion.

* * * * *